United States Patent [19]

Haberle et al.

[11] 4,192,039
[45] Mar. 11, 1980

[54] DOOR GUIDANCE, ESPECIALLY FOR THE TAIL DOOR OF A STATION WAGON

[75] Inventors: Fritz Häberle; Hermann W. Kurth, both of Sindelfingen, Fed. Rep. of Germany

[73] Assignee: Daimler-Benz Aktiengesellschaft, Fed. Rep. of Germany

[21] Appl. No.: 947,834

[22] Filed: Oct. 2, 1978

[30] Foreign Application Priority Data

Oct. 7, 1977 [DE] Fed. Rep. of Germany ....... 2745120

[51] Int. Cl.² .............................................. E05F 5/00
[52] U.S. Cl. ...................................... 16/86 B; 292/342
[58] Field of Search ................. 16/82, 49, 86 B, 86 A; 292/342, 341.12

[56] References Cited

U.S. PATENT DOCUMENTS

| 2,047,425 | 7/1936 | Menges | 292/341.12 |
| 2,075,820 | 4/1937 | McKinney | 292/341.12 |
| 2,217,892 | 10/1940 | Dodge | 292/341.12 |

FOREIGN PATENT DOCUMENTS 2316249 10/1974 Fed. Rep. of Germany ........... 292/342

*Primary Examiner*—George H. Krizmanich
*Attorney, Agent, or Firm*—Craig and Antonelli

[57] ABSTRACT

A door guide for a rear door or tailgate of a station wagon with the guide including a first member, fixed to a body portion of the station wagon, having at least one wedge-shaped recess which is adapted to receive a projection of a second fitting member, fixed to the door or tailgate, when the door or tailgate is closed. The second member includes a metallic base body with the projections thereof having, in run-in zones, two opposed recesses. An elastic abrasion-resistant material is applied by an extrusion coating on the base body with a projecting bead-like elevation of material being provided at the projections. The bead-like material is adapted to be at least partly forced into extrusion-coated recesses in the process of closing the door or tailgate.

5 Claims, 5 Drawing Figures

DOOR GUIDANCE, ESPECIALLY FOR THE TAIL DOOR OF A STATION WAGON

The present invention relates to a door guide and, more particularly, to a guide for a rear door or tailgate of a station wagon which guide includes a first fitting part, for example, fixed to the vehicle body, having at least one wedge-shaped recess in which a second fitting part, for example, fixed to the door or tailgate engages when the door or tailgate is closed with the second fitting part having a projection with a buffer of elastic abrasion-resistant material.

Door guides of the aforementioned type has been proposed in, for example, German Pat. No. 1,132,813, wherein buffers are borne on projections so as to be movable against a force of a spring so that an assured seating of the door, in any position after closure, is guaranteed. Disadvantages of this proposed construction reside in the fact that the the spring is a supplementary structural part and also a precise guidance of the buffer is required. Thus, this proposed guide construction is complex in construction and correspondingly expensive to manufacture.

The aim underlying the present invention essentially resides in providing a vehicle door guide which exhibits good noise-damping characteristics during both a closure of the door and also during driving of the vehicle, and which can be securely fixed in place at the vehicle without complicated or extensive preparation of the vehicle body and/or vehicle door.

In accordance with advantageous features of the present invention, the door guide includes two fitting parts or members with one of the parts or members having a preferably metallic base body and projections which have, along run-in regions thereof, two opposed recesses. An elastic abrasion-resistant material is applied to the base body by extrusion coating and a bead-like elevation of material is provided at the ends of the projections. The bead-like elevation of material projects over the lateral surfaces of application of the projection against surfaces or walls of the recesses provided in the other fitting part or member. The bead-like elevation of material extends or is disposed forward of the two opposed recesses of the respective projections and the bead-like elevation of material is at least partly forced into extrusion-coated recesses defined between adjacent projections during the course of a closure of the door.

To provide for a permanent initial moment, according to the present invention, in assembly or manufacture of the door guide, the extruded material on the fastening side of the surface of application is flush with set-through walls of fastening holes provided in one of the fitting parts or members of the door guide.

Accordingly, it is an object of the present invention to provide a door guide which avoids, by simple means, the shortcomings and drawbacks encountered in the prior art.

Another object of the present invention resides in providing a door guide which can be manufactured by simple mechanized work steps, the completion of which results in a fully functioning part which can be mounted on a vehicle with a minimum expenditure of labor and/or materials.

Yet another object of the present invention resides in providing a door guide which functions reliably under all operating conditions.

A further object of the present invention resides in providing a door guide which is simple in construction and, therefore, inexpensive to manufacture.

A still further object of the present invention resides in providing a door guide which exhibits good sound-damping during a closing of the door.

Another object of the present invention resides in providing a door guide for doors of a vehicle which ensures a secure closure so as to minimize if not avoid the occurrence of undesirable noises during an operation of the vehicle.

These and other objects, features, and advantages of the present invention will become more apparent from the following description when taken in connection with the accompanying drawings which show, for the purposes of illustration only, one embodiment in accordance with the present invention, and wherein.

Figure 1:
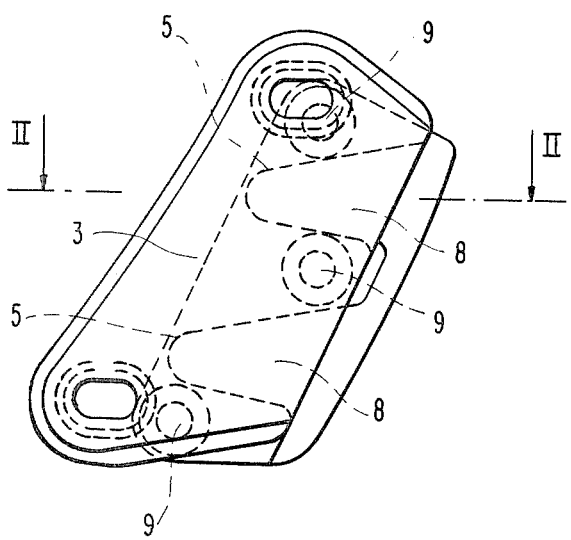
FIG. 1 is a partially schematic simplified view of two fitting parts or members of a door guide, in a working connection, in accordance with the present invention.
Figure 2:
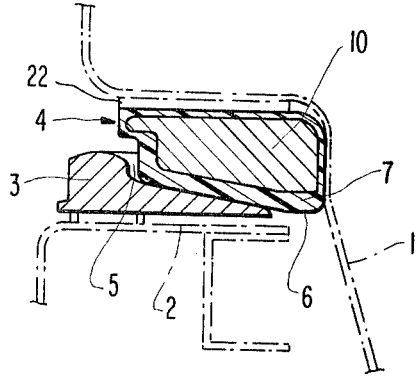
FIG. 2 is a cross-sectional view, taken along the line II—II of FIG. 1.

Referring now to the drawings wherein like reference numerals are used throughout the various views to designate like parts and, more particularly, to FIGS. 1 and 2, according to these figures, a rear door or tailgate 1 of a station wagon is guided by a guide arrangement which includes a first fitting part or member 3 fixed to the vehicle body 2 and a second fitting part or member generally designated by the reference numeral 4 fixed to the rear door or tailgate 1. The first fitting part or member 3, fixed to the vehicle body 2, includes two recesses 5 which have a wedge-shaped configuration all around. The second fitting part or member 4 is provided with projections generally designated by the reference numeral 8 which, upon a closing of the rear door or tailgate 1, securingly engage with the surfaces or walls of the recesses 5. The projections 8 are provided with buffers 6 fashioned of an abrasion-resistant elastic material 7.

The fitting part 4 includes a base body 10 constructed of, for example, a metallic material, with fastening holes 9 being provided which are adapted to receive suitable fasteners (not shown) for fixing or securing the second fitting part or member 4 to the rear door or tailgate 1. As shown most clearly in FIGS. 3–5, the projections 8 of the base body 10 are each provided with two opposed recesses 12 disposed in run-in zones 11 of the respective projections 8.

Figure 5:
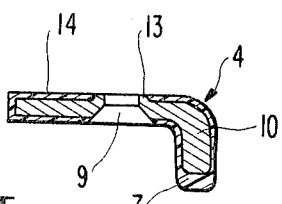
FIG. 5 is a cross-sectional view, taken along the line V—V in FIG. 3.

To obtain the fitting part or member 4, in a mold (not shown), the fixed base body is extrusion-coated with the elastic abrasion-resistant material 7. Subsequently, the fastening holes 9 are punched or otherwise put through the fitting part or member 4 so that the walls 13 of the fastening holes 9 and the extrusion-coated elastic abrasion-resistant material 7 is flush with the surface of application 14 on the fastening side (FIG. 5). A metallic piece or spacer 22 (FIG. 2) may be utilized to compensate for tolerances.

Figure 3:
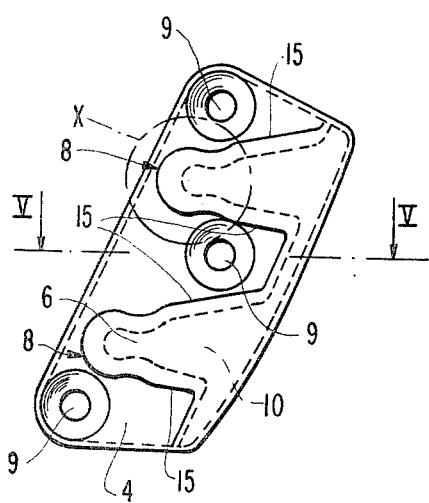
FIG. 3 is a plan view of a fitting part or member in accordance with the present invention with an extrusion coating of elastic, abrasion-resistant material.

A bead-like elevation of material, projecting over lateral surfaces of application of the fitting part or member 4, is disposed in front of or forwardly of recesses 15 provided between adjacent projections 8 and, as shown in FIG. 3, on respective lateral sides of each of the projections 8. The recesses 15 are extrusion-coated with the elastic abrasion-resistant material 7.

Figure 4:
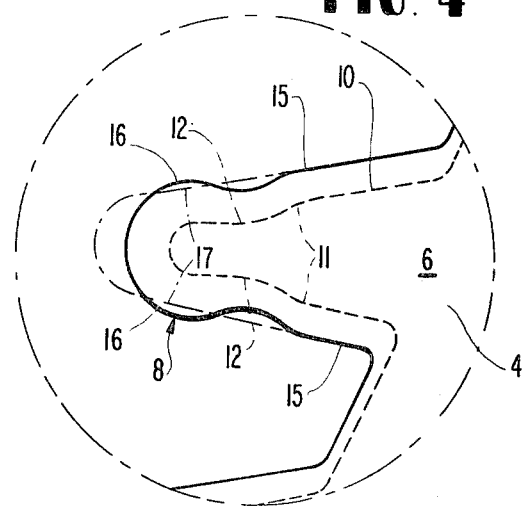
FIG. 4 is a detailed view of the section designated "X" in FIG. 3, on an enlarged scale.

As shown in FIG. 4, the bead-like elevations of material 16 extend over surfaces 17 of the fitting part 3, indicated by dot-dash lines, so that during a closing of the door or tailgate 1, the bead-like elevation of material 16, compensating the existing play, will at least partly be forced into the recesses 15 whereby, at the same time, the door or tailgate 1 will be damped in the closing process.

While we have shown and described only one embodiment in accordance with the present invention, it is understood that the same is not limited thereto but is susceptible of numerous changes and modifications as known to one having ordinary skill in the art, and we therefore do not wish to be limited to the details shown and described herein but intend to cover all such modifications as are encompassed by the scope of the appended claims.

We claim:

1. A guide for doors which includes a first member having at least one wedge-shaped recess therein, a second member having at least one projection adapted to be insertable into the at least one wedge-shaped recess during a closing of the door, and a buffer means of an abrasion-resistant elastic material provided on the at least one projection, characterized in that at least two spaced projections are provided on said second member, said spaced projections define therebetween a further recess, at least two opposed recesses provided in each of the projections along run-in zones thereof, and a projecting bead of elastic material provided on each of the projections and extending over lateral contact surfaces of the respective projections, and in that the projecting bead of elastic material is disposed forwardly of the further recess so that the projecting bead is at least partly forced into the further recess during a closing of the door.

2. A guide according to claim 1, characterized in that the second member includes a base body, and in that the elastic abrasion-resistant material is extruded onto said base body, the projecting bead of elastic material being formed of the elastic abrasion-resistant material.

3. A guide according to claim 2, characterized in that the base body is formed of a metallic material.

4. A guide according to one of claims 2 or 3, characterized in that fastening holes are provided in the second member for permitting the second member to be secured to the door, and in that fastening holes terminate flush with the elastic abrasion-resistant material on a fastening side of the second member.

5. A guide according to claim 4, mounted at a tailgate of a station wagon, characterized in that the first member is fixed to a body portion of the station wagon, and the second member is fixed to the tailgate.

* * * * *